Sept. 2, 1958  N. MARCHAND ET AL  2,850,730
PHASE COMPARISON SYSTEM
Filed Feb. 19, 1945  2 Sheets-Sheet 2
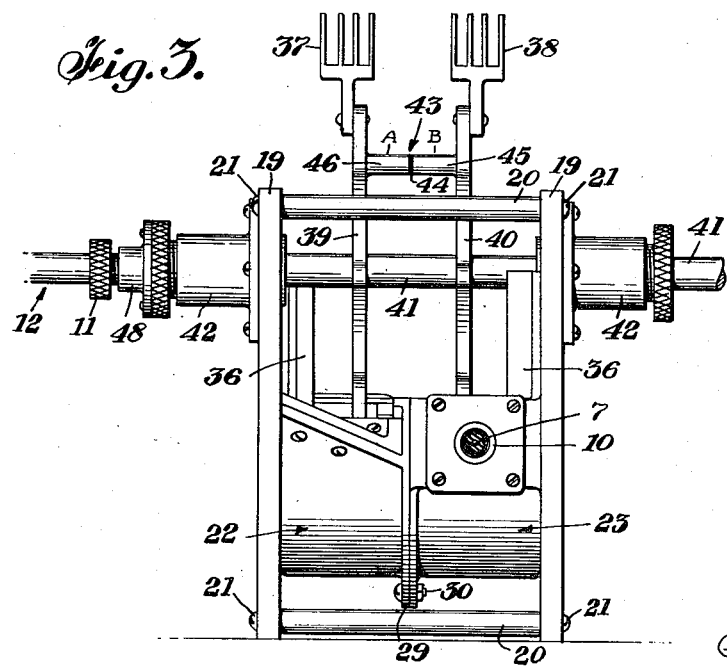
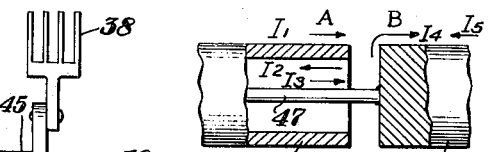
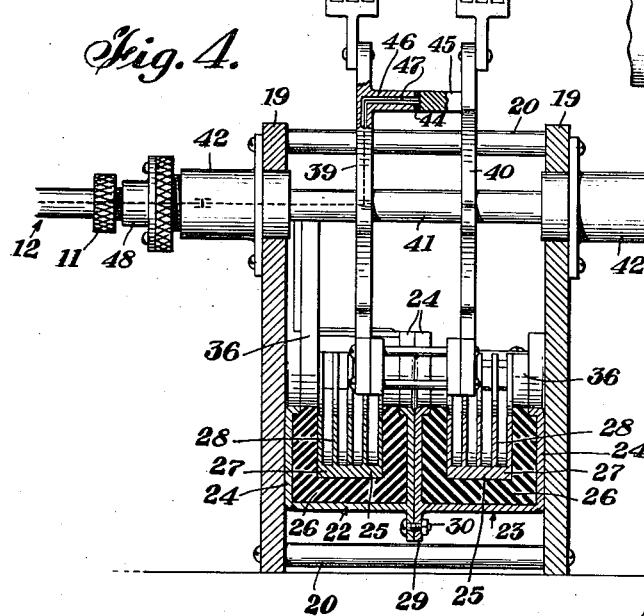
INVENTORS
NATHAN MARCHAND
MILTON SEMEL
BY
ATTORNEY

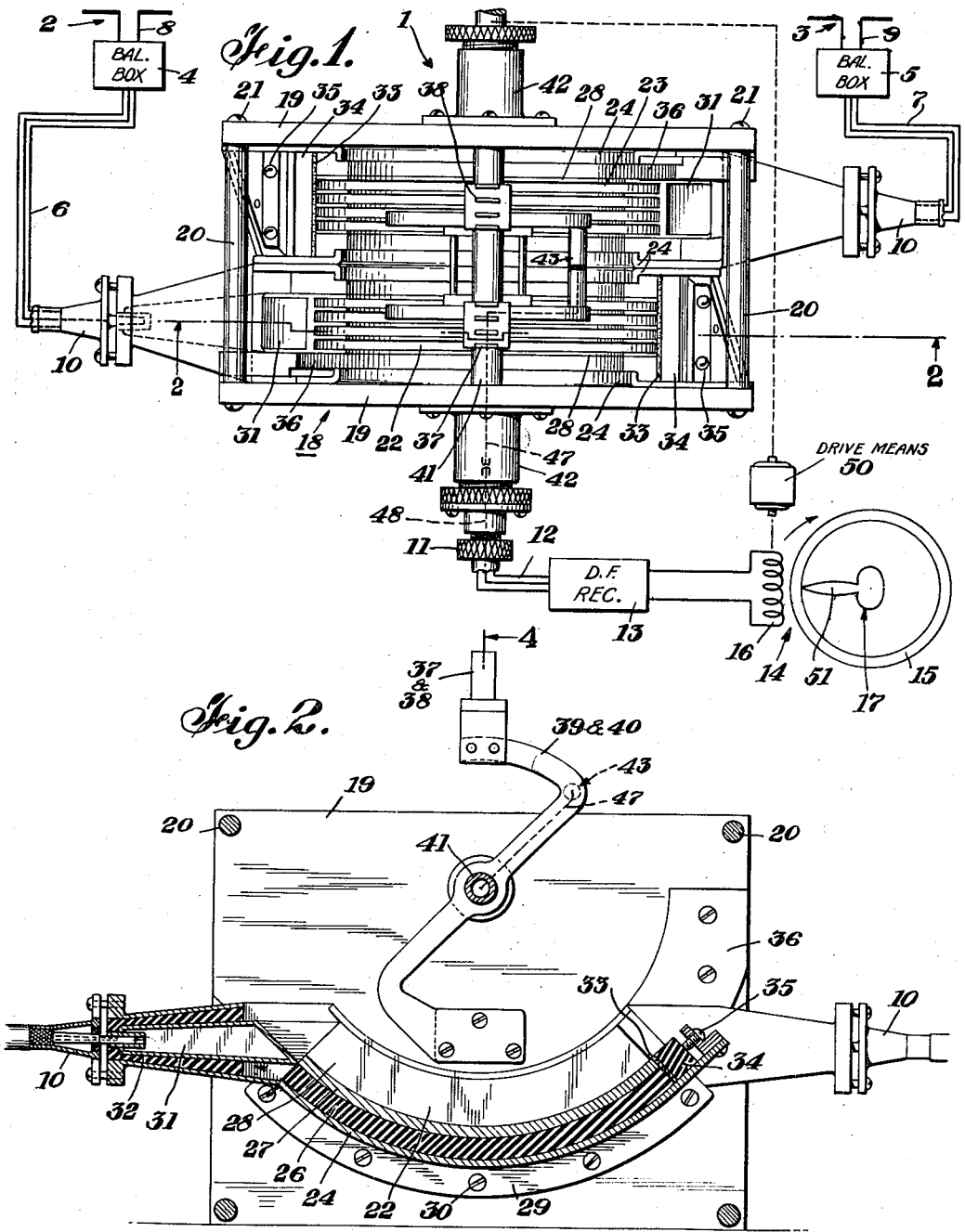

United States Patent Office 2,850,730
Patented Sept. 2, 1958

2,850,730

PHASE COMPARISON SYSTEM

Nathan Marchand and Milton Semel, New York, N. Y., assignors to International Telephone and Telegraph Corporation, a corporation of Maryland Application February 19, 1945, Serial No. 578,741

9 Claims. (Cl. 343—120)

This invention relates to phase comparison systems and particularly to those which are suitable for direction finding or beacon systems.

An object of this invention is the provision of an improved phase comparison system, particularly one adapted for use in directionally shiftable radiant acting systems, such as direction finders or rotary beacons.

In the Patent No. 2,407,659 of Morton Fuchs entitled "Phase Comparison Systems," dated September 17, 1946, there is described a direction finding system of the phase comparison type in which there are artificial transmission lines, each having one end thereof coupled to an antenna element and the other end thereof terminating in a line-matching resistive impedance. The direction finding receiver is coupled to said artificial transmission lines at continuously shifting points thereon, and the deflection of the trace line on the oscilloscope coupled to the output of said receiver, which occurs at a uniform rate of speed, is synchronized with the shifting of the coupling points. As is more fully set forth in said application, this shifting varies the phase relationship of the antennas in regard to the receiver and produces a changing directional radiant action pattern effectively rotating in synchronism with the movement of the trace line. Thus, the system operates to indicate the direction from which energy is being received.

The above described mode of operation is based upon the premise that the phase of the incoming energy varies linearly and uniformly along the length of the artificial transmission lines. This is true only if the lines are electrically flat and have no standing waves. Since the lines are terminated in resistive impedances, matching the characteristic impedance of the artificial lines, said lines would normally be flat poviding no current is drawn by the receiver. If however, the receiver draws current, the lines become mismatched and standing waves are produced. The phase shift along the lines is then no longer linear and the null of the radiant action pattern of the antennas is not regularly rotated in response to shifting of the coupling point along the lines and is not synchronized with the movement of the trace on the oscilloscope. The aforementioned application explains how the lines may be made substantially flat whenever the coupling point is at a null for energy received from a given direction. (By a null coupling point we refer to a common point along both lines at which the energy is equal and in phase.) This preservation of flatness of the lines is accomplished by providing a device interposed between said lines and the direction finding receiver which device offers relatively large impedance to equal in phase currents and a lesser impedance for such currents when they are out of phase. Said relatively large impedance is many times as great as the characteristic impedance of the transmission lines. The aforesaid application describes one device using inductance coils and the fields thereof for this purpose. By the use of such device the lines are always flat at the null points and the positions of said null points correspond to given directions from which energy is received, or given directions of the null of the resultant radiant action pattern. Consequently an accurate null type direction finder is obtained.

Another object of the present invention is the provision of an improved device for presenting high impedance to voltages of a predetermined phase and voltage relationship, and lesser impedance to voltages differing from said relationship.

Another object of the present invention is the provision of a unitary phase comparison device utilizing transmission lines, means for coupling to selected points along said lines, or to continuously shifting points along said lines, and an impedance device adapted to vary its impedance in response to variations of the phase of the energy at the coupling points along said lines.

A feature of said phase comparison device is its suitability for continuous operation and therefore its adaptability for use in direction finding and beacon systems.

Other and further objects of the present invention will become apparent and the foregoing will be best understood from the following description together with the accompanying drawings in which:

Fig. 1 is in part a schematic diagram of a direction finder system including in plan view one form of a phase comparison device embodying our invention.

Fig. 2 is a section taken substantially on the line 2—2 of Fig. 1;

Fig. 3 is a side elevational view of the phase comparison device of Fig. 1;

Fig. 4 is a cross-sectional view taken along the line 4—4 of Fig. 2; and

Fig. 5 is an enlarged schematic diagram used to describe the function of the gap illustrated in the other figures.

The phase comparison device of our invention, generally designated by the numeral 1 is adapted to compare energy from two sources, which may be for example, radiant acting means, more specifically dipole antenna means 2 and 3. Antenna means 2 and 3 may be coupled to the phase comparison device 1 by means of balance boxes 4 and 5 and coaxial lines 6 and 7 respectively. The balance boxes 4 and 5 serve to couple balanced dual transmission lines 8 and 9 which are coupled to antennas 2 and 3, to coaxial lines 6 and 7. Coaxial lines 6 and 7 are in turn connected by means of suitable plugs 10 to the phase comparison device.

The output of phase comparison device 1 is coupled by a plug 11 and line 12 to a translating device, more particularly a direction finding receiver 13 whose output is in turn coupled to an indicator 14 which may include an oscilloscope 15, and a deflection coil 16, adapted to be rotated, to rotate the trace 17 of the oscilloscope.

The phase comparison device 1 includes a frame generally designed by the numeral 18 having opposed conductive walls 19 held together by tie rods 20 cooperating with screws 21. Mounted between said walls 19 are a pair of similar transmission lines 22 and 23 respectively. Said transimssion lines are similarly curved or arcuate. Each of said transmssion lines consists (see Fig. 4) of an outer conductor 24 of substantially channel-like shape within which is arranged an inner conductor 25 separated from the outer conductor by suitable insulation material 26. The inner conductor 25 includes a flat bottom portion 27 from which arises preferably integral therewith a plurality of parallel conductive plates 28 extending longitudinally of the transmission line. The two transmission lines 22 and 23 are mounted adjacent each other with their adjacent walls touching and held together by means of connecting flanges 29 formed on the bottom of the outer conductors 24 thereof and a nut and bolt 30 securing such flanges together. The other walls of said outer conductors touch the walls 19 of the frame.

Opposite ends of transmission lines 22 and 23 are connected by suitable means generally designated by the numeral 31 to a socket means 32 adapted to receive plugs 10. The other ends of each of said transmission means are terminated in an impedance matching the characteristic impedance of each of said transmission lines. In the embodiment shown, said impedances consists of thin plate-like resistors 33 which may be, for example, made of carbonaceous material, each of which resistors 33 is held in contact with the end of the transmission line which it terminates by means of the insulation block 34 pressed against said resistor 33 by a flange and screw arrangement 35.

The transmission lines are held against the walls 19 of the frame by means of integral extensions 36 of the insulating material 26 of the lines, said extensions 36 being secured to the walls 19 by any suitable means. It will be seen that these lines are symmetrically arranged adjacent each other, in parallel side-by-side relationship, with corresponding ends thereof facing in opposite directions. The length of said lines 22 and 23 is preferably determined in relation to the distance between the antenna means 2 and 3, as will be more fully pointed out hereinafter.

In accordance with our invention, means is provided for coupling to various points along said transmission lines 22 and 23 to vary the relative phase of energy received from said two antenna means. Said means consists of a pair of sets of conductive plates 37 and 38 respectively. Plates 37 and plates 38 are mounted respectively on conductive counterbalanced arms 39 and 40 which are in turn pivoted on a shaft 41 mounted for rotation in suitable bearing means 42 fixed to walls 19. Upon rotation of shaft 41, sets of plates 37 and 38 mesh with the plates 28 of transmission lines 22 and 23 respectively and move longitudinally along said lines thus being coupled to various points along said lines. Shaft 41 is arranged at the center of curvature of the transmission lines 22 and 23. Arms 39 and 40 are dimensioned so that when plates 37 and 38 are meshed with their corresponding plates 28 of transmission lines 22 and 23 respectively, lines 39 and 40 together with the walls 19 of the frame forming resonant circuits equal to shorted quarter wave sections at the means frequency at which said phase impedance device is designed to operate, said shaft 41 being conductive and serving to short said resonant sections. Thus lines 39 and 40 will present great impedance to the flow of current therealong.

Conductive means 43 is provided for coupling lines 39 and 40 together adjacent plates 37 and 38. Conductive means 43 includes a non-conductive gap 44, on one side of which is a solid conductor 45; on the other side of which there is a conductor in the form of a coaxial line 46 whose inner conductor 47 crosses the gap, and is connected to and terminates at solid conductor 45. The gap 44 may be an air gap or if desired may consist of an insulator having an opening therein, through which the inner conductor 47 passes.

From transmission line theory it will be seen that if equal and in phase voltages appear at points A and B adjacent gap 44 no current will flow into the coaxial line 46 and along inner conductor 47 thereof. When, however, the voltages at points A and B differ from said relationship the current that will flow into coaxial conductor 46 is a function of the resultant vectorial difference of the instantaneous values of said voltages. This will be more fully understood with reference to the showing of Fig. 5.

Referring now to Fig. 5, assuming a given voltage at A tends to produce a flow of current $I_1$ having a given value and a given direction as indicated by the arrow, a current $I_2$ will tend to flow on the inside of coaxial line 46. This current will be equal in value to current $I_1$ but opposite in direction. Since 46 is a coaxial line, a current $I_3$ will tend to flow along the inner conductor 47 equal in value to current $I_2$ but opposite in direction. Current $I_3$ tends to flow across the gap and in the direction indicated by arrow $I_4$. If however, the voltage at point B is equal to the voltage at point A and in phase therewith the voltage at point B will tend to produce a current $I_5$ equal to and opposite in direction to current $I_1$. Current $I_5$ will oppose current $I_4$ and consequently no current at all will flow. Thus it will be seen that the voltages at points A and B are opposed to each other so that when they are equal and in phase no current will flow in coaxial line 46. When however, the instantaneous values of said voltages are unequal the larger voltage will overcome the lesser and cause a current flow in coaxial line 46. Thus the impedance at the gap varies in accordance with the voltages at points A and B.

Upon analysis it will be seen that the arrangement including arms 39 and 40, the resonant sections formed therewith, and conductive means 43 including solid conductor 45 and coaxial line 46, all consist in essence of a "balanced dual transmission line-to-coaxial line converter," which may be generally designated by the numeral 49. Arms 39 and 40 act as the balanced dual transmission line having a shield which may be considered the walls 19, and coaxial line 46 is the line to which conversion is made.

It will be seen that this arrangement offers very large impedance to equal and in phase voltages appearing at the points at which plates 37 and 38 are coupled to the transmission lines. Consequently very little current is drawn from said lines and they become electrically flat whenever plates 37 and 38 are at such equal, in phase or null points. Thus, as far as such null points are concerned, the lines are flat and the positions of said points along the lines correspond with directions from which energy is being received. As will be seen from the subsequent description, the trace on the oscilloscope is shifted in accordance with the movement of plates 37 and 38 along the transmission lines 22 and 23. Furthermore, when energy is being received on said antennas deflection of said trace occurs whenever plates 37 pass a null point on the transmission lines. Consequently, the position of the deflection of said trace on the oscilloscope indicates the position of the null point along the lines and therefore the direction from which energy is being received.

The electrical length of 90° of the arc of the transmission lines 22 and 23 should be equal to substantially 0.707 times the distance between the two antenna means 2 and 3 if it is desired that the null of the resulting radiant action pattern be shifted 45° when the plates 37 and 38 are 45° off the center point between the ends of the transmission lines.

Coaxial line 46 is connected with arm 39, and arm 39 has an opening therein through which inner conductor 47 passes, said inner conductor in turn passing through a similar opening in shaft 41 and being connected to a socket 48. Plug 11, described hereinbefore, is inserted in socket 48 and couples coaxial line 46 to the direction finding receiver 13 via line 12.

Shaft 41 is adapted to be rotated by any drive means 50 which may be, for example a motor or the like. Drive means 50 is also adapted to synchronously rotate deflection coil 16 on the oscilloscope so that the trace 17 thereon rotaes simultaneously with the rotation of shaft 41 and the shifting of the null of the radiant action pattern of antenna means 2 and 3. The direction finding receiver 13 delivers maximum energy to coil 16 whenever there is no current flowing into said receiver via line 12. This energy produces a deflection 51 of the trace indicating the direction of the null and consequently the direction from which energy is being received. As set forth more fully in the copending application of N. Marchand, entitled "Shiftable Directional Antennas," Serial No.

553,562, filed Sept. 11, 1944, either the rotation of shaft 41 or the rotation of deflection coil 16, or the calibration of the oscilloscope 15 should be made sinusoidal so that the other two may be linear.

While the arrangement illustrated is adapted for direction finding over an arc of roughly 90°, this range may be extended to cover the entire azimuth by having the transmission lines cover 360°. On the other hand, a plurality of such phase shifting devices and their associated antennas may be arranged to cover separate azimuthal arcs. A system of this type is described in the copending application of H. G. Busignies, entitled "Direction Finders," Serial No. 553,598, filed September 11, 1944.

While we have described the specific details of one embodiment of our invention it will readily be seen by those versed in the art that numerous changes can be made in these details without departing from the teachings thereof. For example, while we have shown an oscilloscope as the indicator means it is obvious that other indicator means can be employed. Furthermore, it will be apparent that deflection plates may be used for deflecting the trace instead of a deflection coil. Different types of antenna systems may be employed and may be coupled to the phase comparison device in various other manners known to the art. Changes in the specific shape and number of the plates, rotating arms and the transmission lines will also be apparent. Other variations too numerous to be listed will occur to one skilled in the art from the foregoing description of our invention. Consequently, while we have illustrated our invention in connection with a certain embodiment thereof it should be distinctly understood that this illustration is given merely by way of example and not as a limitation on our invention as set forth in the objects thereof and the accompanying claims.

We claim:

1. In a phase comparison device for comparing energy derived from two sources, the combination of a pair of transmission lines each adapted to have one end thereof coupled to one of said sources and impedance means terminating the other end of each of said lines and matching the characteristic impedance thereof, a pair of variable coupling means for coupling to variable points along each of said lines, conductor means coupling together said coupling means, said conductor means having a non-conductive gap intermediate the ends thereof, the portion of said conductor means on one side of the gap being in the form of a coaxial line having an inner conductor, said inner conductor being coupled to the portion of said conductor means on the opposite side of said gap.

2. The device of claim 1 wherein said inner conductor is connected to the outer surface of the portion of the conductor means on the opposite side of the gap and further including indicator means controlled by the energy transmitted by said coaxial line.

3. In a phase comparison device for comparing energy derived from two sources, the combination of a pair of transmission lines each adapted to have one end thereof coupled to one of said sources, impedance means terminating the other end of each of said lines and matching the characteristic impedance thereof, a pair of variable coupling means for coupling to variable points along each of said lines, a pair of coupling lines each coupled to one of said coupling means, said coupling lines being resonant and having an effective electrical length of a quarter wavelength at the mean frequency at which said device is designed to operate, conductor means coupling together said coupling lines, said conductor means having a non-conductive gap intermediate the ends thereof, the portion of the conductor means on one side of the gap being in the form of a coaxial line having an inner conductor, said inner conductor being coupled to the other side of the portion of the conductor means on the opposite side of said gap.

4. The device of claim 3 wherein each one of said pair of transmission lines includes a curved portion, said coupling lines are rotatable and are each pivoted at the center of curvature of the curved portions of said transmission lines, and said coupling means are mounted for rotation with said coupling lines.

5. The device according to claim 3 wherein each of said transmission lines includes a plurality of parallel conductive plates extending longitudinally of the lines, said plates being curved, each of said coupling lines are rotatable and are pivoted substantially at the center of curvature of said curved plates, and each of said coupling means are comprised of a plurality of conductive plates mounted for rotation on said coupling lines and adapted to mesh with the curved plates of said transmission lines.

6. In a phase comparison device for comparing energy derived from two sources, the combination of a pair of transmission lines each adapted to have one end thereof coupled to one of said sources, impedance means terminating the other end of each of said lines and matching the characteristic impedance thereof, a pair of variable coupling means for coupling to variable points along each of said lines, transmission line means having an input impedance relatively large compared to said transmission line impedance to voltages having a predetermined amplitude and phase relationship and having a lesser input impedance to voltages differing from said predetermined phase relationship, said transmission line means including a balanced line-to-coaxial line converter, and means coupling both said coupling means to said transmission line means.

7. In a phase comparison device for comparing energy derived from two sources, the combination of a pair of transmission lines each adapted to have one end thereof coupled to one of said sources, impedance means terminating the other end of each of said lines and matching the characteristic impedance thereof, a pair of variable coupling means for coupling to variable points along each of said lines, transmission line means having an input impedance relatively large compared to said transmission line impedance to equal, in phase voltages, and having a lesser input impedance to voltages differing from said relationship, said transmission line means including a balanced line-to-coaxial line converter, and means coupling both said coupling means to said transmission line means.

8. In a directional shiftable radiant acting system including two spaced radiant acting means and a radiant energy translating device, means for coupling said radiant acting means to said radiant energy translating device in variable phase relationship thereto comprising a pair of transmission lines each coupled to one of said radiant acting means, impedances terminating each of said transmission lines and matching the characteristic impedance of said lines, variable coupling means for coupling to variable points along each of said lines, and conductor means coupling together said coupling means, said conductor means having a non-conductive gap intermediate the ends thereof, the portion of said conductor means or one side of the gap being in the form of a coaxial line having an inner conductor, said inner conductor being coupled to the portion of said conductor means on the opposite side of said gap, said coaxial line being coupled to said translating device.

9. A radio direction finder system comprising two spaced antenna means, a pair of transmission lines coupled at one end thereof to one of said antenna means, a pair of impedances each terminating one of the other ends of said transmission lines and matching the characteristic impedance of said lines, a radio receiver means, means for coupling said transmission lines to said radio receiver means in variable phase relationship comprising a pair of variable line coupling means adapted to be coupled to variable points on said transmission lines, conductor means coupling together said line coupling means, said conductor means having a non-conductive gap intermediate the ends thereof, the portion of said conductor means on one side of the gap being in the form of a coaxial line having an inner conductor, said inner conductor being coupled to the portion of said conductor means on the opposite side of said gap, indicator means coupled to the output of said receiver means, means for producing a trace line on said indicator means in accordance with the phasing between said receiver means and said antenna means, and means for deflecting said trace line in response to said energy received in said receiver means, said receiver means being coupled to said coaxial line.

References Cited in the file of this patent

UNITED STATES PATENTS

| | | |
|---|---|---|
| 961,265 | Stone | June 14, 1910 |
| 2,283,676 | Kandoian | May 19, 1942 |
| 2,333,322 | Levy | Nov. 2, 1943 |